March 20, 1945.  S. G. SAUNDERS ET AL  2,371,847
APPARATUS AND METHOD FOR BONDING COMPOSITE ARTICLES
Filed Dec. 18, 1942
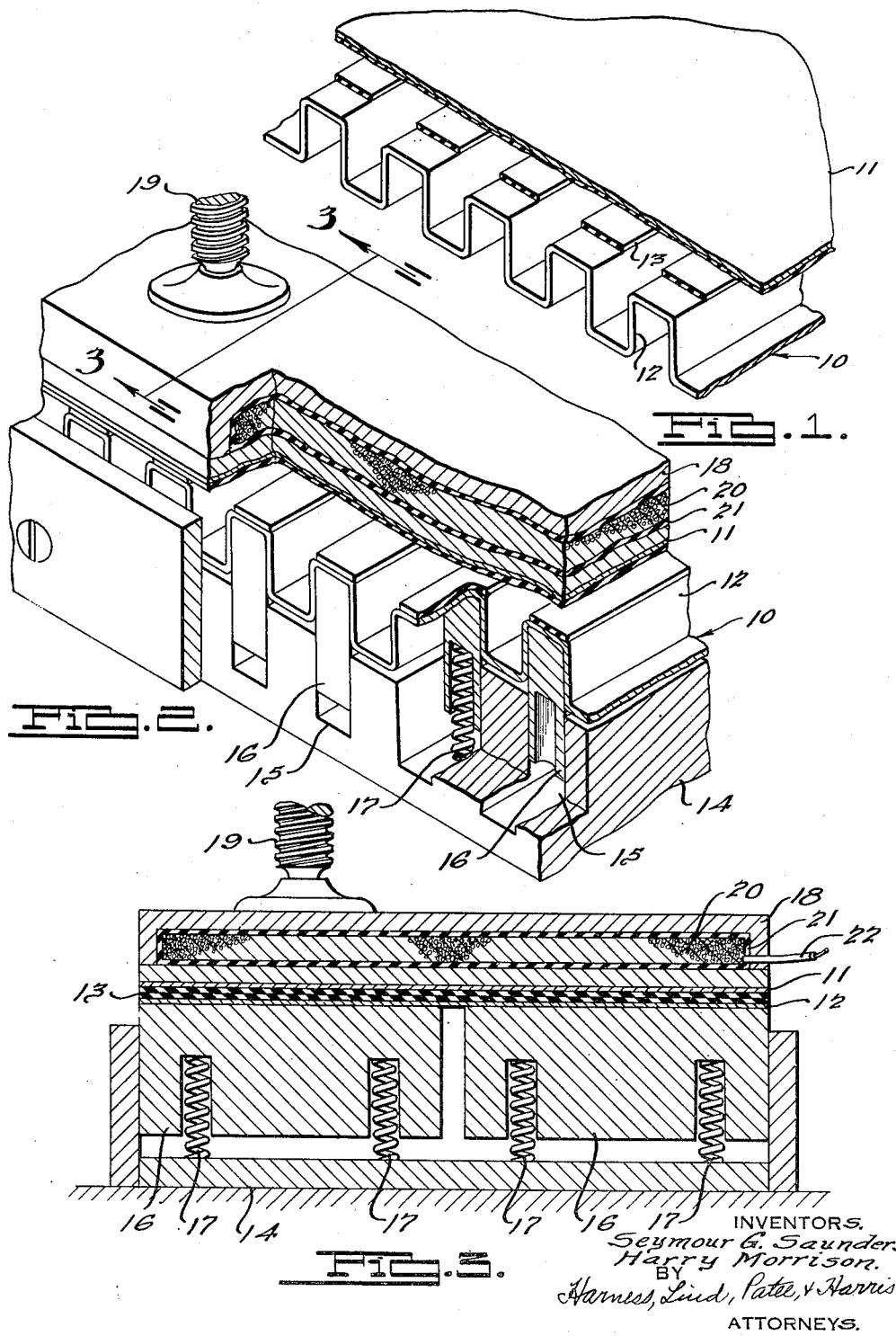
INVENTORS.
Seymour G. Saunders,
Harry Morrison.
BY
Harness, Lind, Patee, & Harris
ATTORNEYS.

Patented Mar. 20, 1945

2,371,847

UNITED STATES PATENT OFFICE 2,371,847

APPARATUS AND METHOD FOR BONDING COMPOSITE ARTICLES

Seymour G. Saunders, Bloomfield Hills, and Harry Morrison, Detroit, Mich., assignors to Chrysler Corporation, Highland Park, Mich., a corporation of Delaware Application December 18, 1942, Serial No. 469,402

11 Claims. (Cl. 154—1)

This invention relates to an improved apparatus and method for the manufacture of a cemented composite structure.

More particularly the invention relates to improvements in apparatus and method for applying pressure to the parts to be bonded together and heat to a film of bonding cement disposed between such parts.

One of the main objects of the invention is the provision of apparatus and method for assuring intimate and uniform contact between the adjacent surfaces of the parts to be bonded together and the cement film therebetween during the administering of heat to the film and pressure to the surfaces. Such intimate and uniform contact is had by the application of uniform pressure throughout the surfaces which are to be bonded together.

More particularly the invention has for its object the provision of improved apparatus and method for cementing together parts at least one of which includes a plurality of spaced offsets or corrugations each having a surface adapted to be bonded to the surface of the other part by a coating or film of heat curing cement therebetween; to provide intimate and uniform contact between the corrugation surfaces and the surface of the other part by individually floatingly supporting each of said corrugation surfaces; and to provide a support of this character in the form of a pressure backing member having a portion extending into the associated corrugation and having a face thereof corresponding to the contour of and engaging the face of the corrugation opposite the surface of the latter which is to be bonded to the other part.

Other objects and advantages of the invention will be more apparent from the following description taken in connection with the accompanying drawing, in which:

Fig. 1 is a fragmentary perspective view of a composite structure including parts cemented together according to the invention.

Fig. 2 is an enlarged fragmentary perspective view illustrating the improved apparatus and method for cementing together the structural parts of Fig. 1.

Fig. 3 is a sectional elevational view taken as indicated by the line 3—3 of Fig. 2.

The invention is illustrated and described in connection with the bonding together of parts by a heat curing cement. One of these parts, generally designated by the numeral 10, includes a plurality of corrugations 12, the crown or top surface of alternate corrugations being bonded to the adjacent surface of the overlying part 11 by a film or layer of cement 13 therebetween. The composite structure or article thus formed may be utilized as flooring, for example, with the part 10 constituting the support for the flat floor surface provided by the part 11.

The cement of the film 13 may comprise any heat hardening cement which either thermosets or vulcanizes to a solid set state and which is adapted to bond to metal, as the aluminum parts 10 and 11. Cements of the composition disclosed in our co-pending application Serial No. 394,798 may be used in this operation but numerous readily available heat setting cements, such as vulcanizable rubber cements, phenol formaldehyde cements, and urea formaldehyde cements may also be employed. Cements of the foregoing character may be applied to the surfaces of the parts to be bonded together by spraying, flowing or brushing operations and permitted to dry without becoming irreversibly set prior to assembly of the parts by subjecting the cement deposits to an atmosphere which causes evaporation of the solvent or vehicle thereof and deposition of the solids of the cement. This procedure prevents flow of the cement from between the parts in response to pressure during the setting operation.

Those surfaces of the parts 10 and 11 which are to be bonded together by a layer of cement therebetween are firmly pressed together by the apparatus shown in Figs. 2 and 3 during heating of the cement. This pressure apparatus includes a base 14 having a plurality of slots 15 therein in each of which is disposed a pressure backing member 16. The base 15 and backing members 16 are preferably rigid structures and are formed of metal although other materials may be used for this purpose.

Each member 16 is floatingly mounted or supported in its slot 15 by springs 17 and is removably positioned therein. The relative dimensions of the slots and members 16 are such that the latter are retained against appreciable lateral movement but may rock about an axis transverse to the longitudinal dimension of the bar and associated corrugation 12. The number and length of the members 16 may vary as the length of the corrugations vary and to accommodate operation on different materials and various gauges thereof, it being understood that this variation in number and length of the members 16 is to assure intimate and uniform contact between the adjacent surfaces of the parts and the cement film therebetween during the application of pressure and heat as hereinafter set forth.

A portion of each member 16 is received in a corrugation 12 as shown in Fig. 2, and has a face thereof conforming to the contour of and abutting the face of the corrugation opposite the surface of the latter which is to be cemented to the part 11. Each member 16 has such clearance with its associated corrugation as will permit shifting of the latter laterally with respect to the member 16. In the formation of the corrugated part 10 certain irregularities may result. For example, one corrugation 12 may have a height greater or less than the height of another corrugation, or the surface of a corrugation or a portion thereof which is to be cemented to the part 11 may not be disposed in the desired plane. Where these and other irregularities in surfaces are present there is an accompanying variation in pressure and a resulting lack of uniform and intimate contact between the surfaces to be bonded together and the film or layer of cement.

The structure illustrated accommodates limited relative movement between portions of the part 10 in order to assure intimate and uniform contact between the surfaces of the latter and the cement film and the surface of the part 11. This contact assures a strong bond between the parts inasmuch as the entire area of the particular surfaces are included in the bond.

The parts 10 and 11 are disposed in superimposed relation as shown in Fig. 2 with a pressure platen 18 engaging the part 11. Pressure is applied by a plurality of clamps, one of which is shown at 19 although it will be understood that other means may, within the scope of the invention, be employed for pressing the parts together.

Heat is supplied to the cement, including the coating applied to each of the parts 10 and 11, by one or more electric heating elements, one of which is shown at 20, carried by the platen 18, the latter including separable sections as shown in Fig. 3 to accommodate installation and removal of the elements 20. Each element 20 is insulated at 21 with respect to the platen 18 and is provided with suitable connectors, one of which is shown at 22, with a suitable source of electrical energy (not shown).

A curing temperature is applied to the cement during the pressure operation to thereby cause the cement to flow and bring the same into uniform and intimate contact throughout the entire area of the surfaces to be bonded together. The direct proximity of the heating element to the cement insures proper curing thereof in a relatively short period of time by a concentration of a curing temperature.

In the operation the cement is applied to the surfaces to be bonded together and allowed to dry without becoming irreversibly set prior to assembly of the parts by subjecting the cement deposits to an atmosphere which causes evaporation of the solvent or vehicle thereof and disposition of the solids of the cement. The part 10 is then placed upon the base 14 with the members 16 disposed in a respective corrugation 12, it being noted that other corrugations opening upwardly are disposed between adjacent members 16 and may engage the registering portion of the base 14. The part 11 is then superimposed upon the top surface or crowns of the corrugations backed by the members 16. The parts 10 and 11 are then pressed together by clamps 19 simultaneously with the energization of the heaters 20.

While the invention is illustrated and described in connection with a part having corrugations, it will be understood that in its broader aspects the invention may be employed in the cementing together of other parts at least one of which has offsets or irregularities of a type other than corrugations. Parts other than the aluminum parts 10 and 11 may be bonded together according to the invention and for this purpose thermo-plastic cements may be utilized as the bonding agent.

Although but one embodiment of the invention is herein shown and described, it will be understood that various changes in the size, shape and arrangement of parts may be made without departing from the spirit of our invention and it is not our intention to limit said invention other than by the terms of the appended claims.

We claim:

1. Apparatus for bonding together by a heat curing cement two metallic parts one including a plurality of corrugations each having a crown surface thereof to be bonded to a surface of the other part: a base having a plurality of slots therein, a pressure backing bar removably disposed in each of said slots, each of said bars having a portion thereof received in a respective corrugation of said one part and engageable with a face of the crown thereof opposite that surface which is to be bonded to said other part, a pressure platen engageable with said other part to press said surfaces together with a coating of cement therebetween, a spring acting between said base and each bar yieldably opposing said pressure application, said platen including a heating element overlying said surfaces and operable to supply a curing temperature to said coating by passing an electric current through said other part.

2. Apparatus for bonding together by a heat curing cement two metallic parts, one including a plurality of corrugations each having a surface thereof adapted to be bonded to a surface of the other part: a base, a plurality of pressure bars individually floatingly supported from said base and respectively extending into said corrugations and engageable with a face thereof opposite that surface thereof which is to be bonded to said other part, a pressure platen engageable with said other part to press said surfaces together with a coating of cement therebetween, and an electrically energized heating element within said platen operable to supply a curing temperature to said coating by passing an electric current through said other part during said pressing operation.

3. Apparatus for bonding together by a heat curing cement two parts one including a plurality of corrugations each having a surface thereof to be bonded to a surface of the other parts: a base having a plurality of slots therein, a pressure backing bar disposed in each of said slots and having a portion thereof disposed in a respective corrugation of said one part and engageable with a face thereof opposite that surface which is to be bonded to said other part, a pressure platen engageable with said other part to press said surfaces together with a coating of cement therebetween, individual support means for each of said bars operable to accommodate relative movement of the latter and relative movement of said corrugation surfaces during said pressing operation to thereby substantially uniformly distribute pressure to the surfaces to be bonded together, and heating means operable to supply a curing temperature to said coating of cement through said other part during said pressing operation.

4. Apparatus for bonding together parts, one of which includes a plurality of corrugations each having a crown surface adapted to be bonded to a surface of the other part; a base, a plurality of rigid pressure bars respectively extending into said corrugations and having a face conforming to the contour of and engageable with that face of the associated corrugation opposite the surface of the latter which is to be bonded to said other part, a pressure platen engageable with said other part to press said surfaces together with a bonding agent therebetween, and means floatingly mounting each of said pressure bars with respect to said base whereby relative movement of said corrugation surfaces is accommodated during said pressing operation.

5. Apparatus for bonding together by a heat curing cement two parts one having a plurality of spaced offset portions each having a surface adapted to be bonded to the surface of the other part; relatively movable pressure applying means respectively operable on said parts for pressing the surfaces thereof together with a coating of cement therebetween, one of said pressure applying means including a plurality of individually floatingly mounted members engageable with a respective offset portion of said one part, and a heating element disposed to supply a curing temperature through one of said parts to said coating during pressing of said surfaces together.

6. Apparatus for bonding together by a heat curing cement two parts one including a plurality of corrugations each having a surface thereof adapted to be bonded to a surface of the other part; a base, individual pressure backing means for each of said corrugations, each of said means including a plurality of individually floatingly supported bars carried by said base and engageable with a face of the associated corrugation opposite that surface thereof which is to be bonded to said other part, a pressure platen engageable with said other part to press said surfaces together with a coating of cement therebetween, and means for supplying a curing temperature to said coating of cement during said pressure operation.

7. In the manufacture of a composite article having parts bonded together by cement, one of said parts including a plurality of corrugations each having a surface adapted to be bonded to the surface of the other of said parts; the method of bonding the said surfaces of said parts together which comprises inserting a rigid floatingly supported pressure backing member in each of said corrugations, arranging the surfaces to be bonded together in overlapping relationship with a coating of heat curing cement therebetween, applying pressure to the said other of said parts for pressing said surfaces together, and simultaneously heating said coating to its curing temperature.

8. In the manufacture of a composite article including parts bonded together by cement, one of said parts including a plurality of corrugations each having a surface adapted to be bonded to the surface of the other of said parts; the method of bonding the said surfaces of said parts together which comprises individually floatingly supporting each of said corrugation surfaces, pressing the said surfaces of said parts together with a coating of heat curing cement therebetween, and simultaneously heating said coating to its curing temperature.

9. In the manufacture of a composite article including parts bonded together by cement, the method of bonding such parts together which comprises disposing said parts in superimposed relation with a coating of cement between the surfaces thereof to be bonded together, floatingly supporting one of said parts by a plurality of rigid and individually movable supports respectively engaging portions of said one part, and simultaneously pressing said parts together and heating said coating to its curing temperature.

10. Apparatus for bonding together parts by a heat curing cement between adjacent surfaces thereof; a base, a plurality of laterally adjacent rigid bar-like members adapted to engage respective portions of one of said parts, a pressure platen engageable with the other of said parts to press said surfaces together with a coating of the cement therebetween, individual spring means floatingly supporting each of said bar-like members from said base and adapted to accommodate limited individual movement of said members relative to said base during said pressure operation, such that substantially uniform pressure is applied to the surfaces and the cement therebetween during said operation, and a heating element carried by said platen and overlying said surfaces for applying a curing temperature to the cement during said operation.

11. Apparatus for bonding together parts by a bonding agent between adjacent surfaces thereof; a base, a plurality of rigid laterally adjacent support members adapted to engage respective surface portions of one of said parts and so arranged one relative to the other and with respect to said base as to accommodate limited relative movement therebetween, a pressure platen engageable with the other of said parts to press said surfaces together with the bonding agent therebetween, and means floatingly mounting each of said pressure members with respect to said base accommodating relative movement of said members and said respective surface portions engaged thereby during said pressing operation whereby substantially uniform pressure is applied throughout said adjacent surfaces.

SEYMOUR G. SAUNDERS.
HARRY MORRISON.